Jan. 10, 1950     J. H. RUBENSTEIN     2,493,779
MAGNETOMETER
Filed Feb. 5, 1945     2 Sheets—Sheet 1
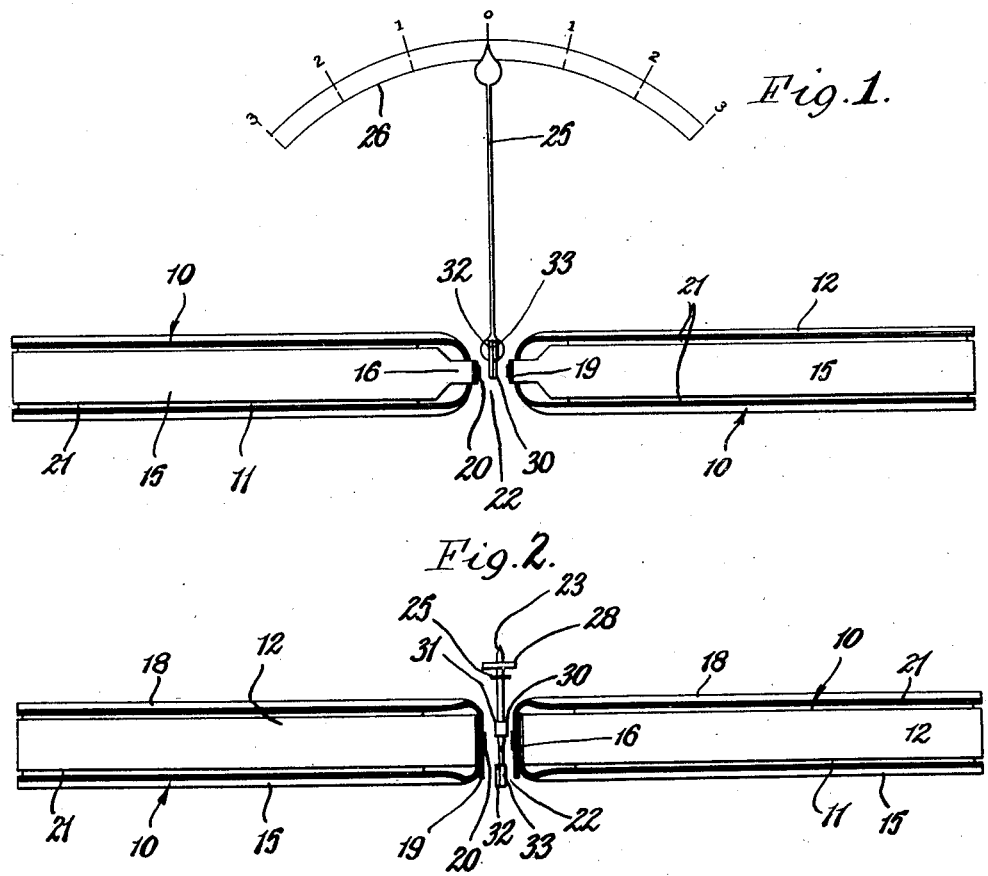
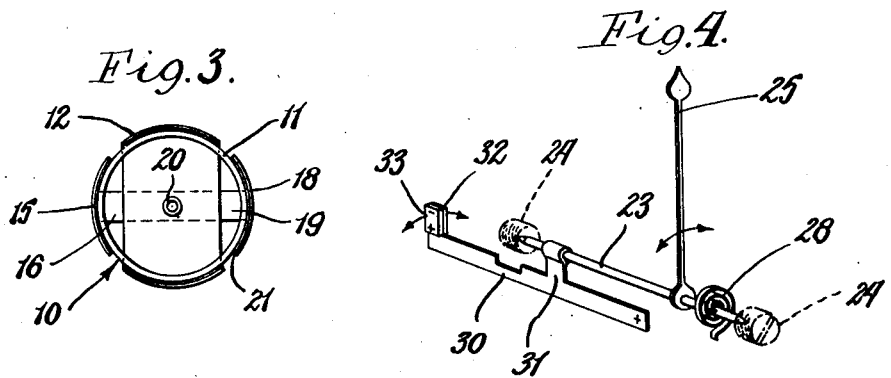
INVENTOR.
Jacob H. Rubenstein
BY Popp and Popp
Attorneys.

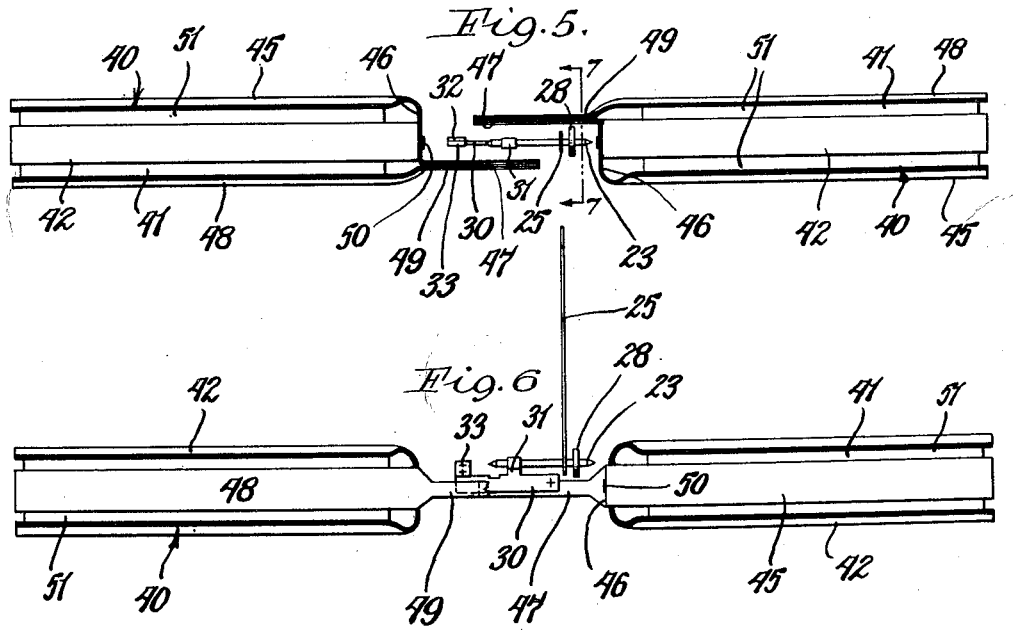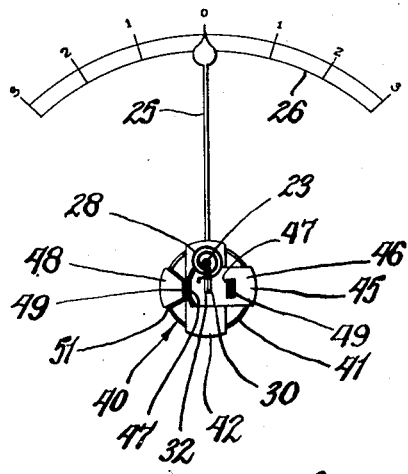

Patented Jan. 10, 1950

2,493,779

UNITED STATES PATENT OFFICE 2,493,779

MAGNETOMETER

Jacob H. Rubenstein, Buffalo, N. Y.

Application February 5, 1945, Serial No. 576,343

4 Claims. (Cl. 175—183)

This invention relates to a magnetometer for determining the direction or intensity of the lines of force of a magnetic field, such as the magnetic field of the earth, and which can be used to determine the magnetic meridian of the earth's magnetic field, its horizontal, vertical and total force components and the angle of inclination and the angle of declination thereof.

This application is a continuation-in-part of my co-pending application Serial No. 562,728, filed November 9, 1944 for Method and apparatus for determining the direction or intensity of the lines of force of a magnetic field, now abandoned.

One of the principal objects of the invention is to provide such a magnetometer which operates without the application of power from an outside source, and which further can be made extremely sensitive so as to respond to slight changes in the direction or intensity of the lines of force of a surrounding magnetic field. By operating independently of an external power source, the magnetometer can be used as a completely independent unit and does not require batteries or the like and is free from the difficulties of care and maintenance inherent in an electronic circuit.

Another object is to provide such a magnetometer which is accurate in its response.

Another object is to provide such a magnetometer which can be made to have as sharp or as broad a response as desired, that is, in which the curve plotted from a succession of readings on rotating the magnetometer in a field can be as peaked or as flat as desired.

Another object is to provide such a magnetometer in which such adjustments are of stationary parts of the magnetometer so that no adjustment of the movement of the magnetometer is required in altering its sharpness of response.

Another object is to provide such a magnetometer in which the movement has slight mass and low inertia and at the same time accurately and rapidly responds to indicate changes in the field under measurement.

Another object is to provide such a magnetometer which is rugged and simple in construction, regardless of its sensitivity, thereby to permit of its manufacture at low cost and to supply precision navigation instruments for low cost civilian airplanes, as well as to permit the use of several magnetometers to separately indicate the several factors affecting navigation.

Another object is to provide such a magnetometer which is light in weight and is not liable to get out of order under conditions of severe and constant use.

Another object is to provide such a magnetometer which is stable in its response.

Another object is to provide such a magnetometer having antenna members the special construction of which contributes to the fulfillment of the foregoing objectives.

Other objects and advantages will appear from the following decrription and drawings, in which:

Fig. 1 is an elevational view of the antenna members, movement and scale of the magnetometer embodying the present invention, the support or casing being eliminated for clarity.

Fig. 2 is a top plan view of the antenna members and movement shown in Fig. 1.

Fig. 3 is an end view of one of the antenna members shown in Figs. 1 and 2.

Fig. 4 is a perspective of the movement shown in Figs. 1 and 2.

Fig. 5 is a view similar to Fig. 2 and showing a modified form of the invention.

Fig. 6 is a view similar to Fig. 1 and showing the form of the invention illustrated in Fig. 5.

Fig. 7 is a sectional view, taken on line 7—7, Fig. 5.

An important feature of the magnetometer forming the subject of the present invention resides in the use of antenna members to attract a large sheath or cylinder of the lines of force of the field to be measured, this feature supplying the necessary power for operating the magnetometer so as to eliminate the necessity for an external source of power. A pair of such antenna members are provided in spaced coaxial arrangement and a lever polarized by a permanent magnet is rotatably mounted with its free polarized end in the concentrated field between the two antenna members, thereby to be attracted toward one or the other depending upon the polarity of the antenna members as determined by the position of the antenna array with reference to the magnetic field under measurement. While the antenna members can be excited, entirely satisfactorily results have been obtained with unexcited antennas as shown, the concentration of the field between the unexcited antennas being sufficient to operate an indicator or pointer from the polarized lever against the resistance of a return spring.

With particular reference to the form of the invention shown in Figs. 1–4, the antenna members, indicated generally at 10, can be varied in their construction, a preferred form being shown in the drawings in which each antenna member includes a round tubular core 11 of brass or other non-magnetic material so that each antenna member is hollow and generally round in cross section. On this tubular core is wrapped a plurality of laminations of high initial magnetic permeability and low coercive force. These laminations are shown as being arranged in pairs, one pair 12 extending along one side of the core 11, around that end of the core which opposes the other antenna member, and along the opposite side of the core, the ends of the laminations terminating adjacent the outer extremities of the cores. The legs or parallel portions of this pair of laminations are preferably transversely curved to fit the core 11. Another pair 15 of these laminations is L-shaped in longitudinal section, the laminations being curved to fit one of the other sides of the tubular core 11 and having an end 16 of reduced width overlapping the pair 12 of laminations at the inner extremity of each antenna member. A third pair 18 of these laminations is likewise L-shaped in longitudinal section and curved to fit the fourth side of the tubular core 11 and has an end 19 of reduced width overlapping the ends 16 of the pair 15 of laminations at the inner extremity of each antenna member. The overlapping portions of the pairs 12, 15 and 18 of laminations can be secured together in any suitable manner as by the axially positioned brass eyelet or grommet 20 shown and the opposite extremities of these laminations can be secured to the tubular core 11 in any suitable manner.

It will be noted that each antenna member is composed of a group of metal laminations of high initial magnetic permeability which are arranged in the general form of a cylinder, this being an important feature of the invention as hereinafter discussed. However, it is also an important feature of the invention that this cylindrical form of the laminations of each antenna member be broken by one or more longitudinally extending gaps, such as the four gaps 21, these gaps breaking up the otherwise ring form of the antenna in cross section and hence any substantial tendency toward transverse polarization.

The two antenna members 10 are secured to a casing or support (not shown) in axially opposed relation to each other with the overlapped ends of their laminations spaced to provide a gap 22. In this gap and in approximate alinement with the axis of the two antenna members is arranged the free end of a polarized lever which forms a part of the movement illustrated in perspective in Fig. 4.

This movement includes a shaft 23 which is supported at its ends in bearings 24 in the casing or support of the magnetometer. An indicating hand or pointer 25 is fast to this shaft and traverses a scale 26 which is shown as having a zero centerpoint, although any appropriate graduation indicia can be employed. A hairspring 28 has one end secured to the shaft 23 to bias the pointer 25 toward its zero position, the other end of this hairspring being secured to the support or casing for the magnetometer. As previously indicated, for clarity, this support or casing is not illustrated.

Fast to the shaft 23 is an iron vane 30, this iron vane being secured by a lever arm 31 which embraces the shaft 23 so that the iron vane is, in effect, a lever fast to the shaft 23 and with its free end generally in line with the axis of the antenna members 10 and at right angles thereto in its neutral or zero position so that the free end of the lever is capable of being attracted toward one antenna member 10 or the other. It is not necessary, however, that the axis of the movement be at right angles to the axis of the antenna members, as illustrated in Figs. 5–7.

The iron vane is polarized and for this purpose a small strip 32 of aluminum is secured to one end of the iron vane to project toward its axis of rotation. The projecting end of this strip 32 of aluminum carries a small permanent magnet 33, this permanent magnet preferably being of high coercive force alloy to produce a field of high magnetic strength. This permanent magnet is shown as having its end of positive polarity in contact with the edge of the iron vane so that the entire iron vane is of positive polarity, as indicated.

The magnetometer, as above described, can be used to determine the magnetic meridian of the earth's magnetic field, the horizontal, vertical and total force components of the field, and the angle of inclination and declination of the lines of force thereof. For example, if the magnetometer is rotated so that the axis of the antenna members 10 traverses the magnetic meridian, when the axis of the antenna members becomes parallel with the lines of force of the field, a large sheath or cylinder of the lines of force is attracted from the surrounding field into the antenna members 10 and forms a concentrated field across the gap 22. The polarity of the antenna array will depend upon the polarity of the lines of force of the field. Thus, if the array is arranged so that the right hand antenna member 10 is parallel with the lines of force and projects toward the north geographic pole of the earth its right hand or outer end is of plus polarity by induction and its opposite or inner end is polarized negatively by induction. Conversely, the polarization of the opposite or left hand antenna member 10 by induction is negative at its outer or left hand end and positive at its inner or right hand end. Since the iron vane 30 is positively polarized it will, under these conditions, be attracted toward the right, as viewed in Figs. 1 and 2, or toward the negatively polarized inner end of the right hand antenna member 10. This movement of the iron vane 30 to the right swings the pointer 25 to the left hand extremity of the scale 26.

As the array of antenna members 10 is swung out of alinement with the lines of force of the surrounding field, the number of lines of force attracted to the array to traverse its axis progressively diminishes. Consequently, the strength of polarization of the array diminishes and the iron vane 30, under the influence of the hair spring 28, moves away from the weakening negative pole at the inner end of the right hand antenna member thereby to progressively move the pointer 25 to the right toward the centered or zero position on the scale 26. When the array, so rotated out of alinement with the lines of force of the surrounding field, reaches a position where it is at right angles to the lines of force none of these lines of force are attracted to the array to traverse its axis. In this position all of the lines of force of the surrounding field pass through the array transversely. Consequently, the array is not axially polarized and the pointer 25 is held at its zero position solely under the influence of the hairspring 28.

As the assumed rotation of the magnetometer in the magnetic meridian is continued from this neutral or zero position, the number of lines of force attracted to the antenna array to traverse its axis progressively increases. However, the right hand antenna member 10, as viewed in Figs. 1 and 2, is now being rotated toward the south geographic pole of the earth and hence the polarity of the array is reversed. The inner end of the right hand antenna member 10, as viewed in Figs. 1 and 2, is now polarized positively by induction and the inner end of the left hand antenna member negatively by induction. Consequently, the positively polarized iron vane 30 is attracted to the left, as viewed in these figures so as to cause the pointer 25 to traverse the right hand side of the scale 26.

As the antenna array is so rotated toward realinement with the lines of force of the earth's magnetic field, the number of lines of force attracted to the array to traverse its axis progressively increases, a larger and larger cylinder of these lines being so attracted. As a consequence the pointer 25 is moved further along the right hand side of the scale 26 until the point is reached where the array is again in alinement with the lines of force of the surrounding field and the maximum number of lines of force are attracted to the antenna array to traverse its axis. Consequently, the polarity of the array is at maximum strength and the pointer 25 is at the extreme right hand position on the scale 26. Since the polarity of the array is reversed as compared with the condition first assumed, the pointer 25 is at the opposite extremity of the scale 26 as compared with the position first assumed.

It will therefore be seen that the scale 26 is, in effect, two half scales joined to provide a single whole scale. Thus, the left hand side of this scale is used when the antenna array is rotated in one direction from its neutral position at right angles to the lines of force under measurement and the left hand side is used when the array is rotated in the opposite direction from this neutral position. The magnetometer thereby measures the strength of the surrounding magnetic field through a full 360° rotation of the magnetometer and accordingly can be used to determine the total force, the magnetic meridan, the horizontal component, and the vertical component of the earth's magnetic field, as well as the angle of inclination and the angle of declination thereof.

The materials used and the relative size of the parts has a pronounced effect upon the operation of the magnetometer.

As to the form and composition of each of the antenna members 10, the material used as the laminations for the antenna members should have high initial permeability and low coercive force. It is also desirable that the antenna members be generally round in cross section so that no change in magnetization results from rotation of the magnetometer about the axis of these members, there being a change in reading of the magnetometer when rotated about the axis of the antenna members unless they are substantially round in cross section. However, where the use of the magnetometer does not involve such rotation about the axis of the antenna members, antenna members of other cross sectional shape are, of course, entirely practicable.

The sharpness of response of the magnetometer is determined by the reluctance of the antenna members. With low reluctance antenna members the response is in the form of a sharp curve and with high reluctance antenna members the response is in the form of a broad curve. The reluctance of the antenna members can be increased by increasing their length without increasing their cross sectional dimensions. It will therefore be seen that any desired condition of sharp or flat response can be achieved by the simple expedient of proportioning the length of the antenna members to obtain the desired response.

A further important feature of the cylindrical antenna members 10 is that they are of hollow or tubular form with their opposing ends closed, as shown, to provide opposed poles for the antenna array, the opposite or outer ends of the antenna members being open, as shown. When used in a magnetometer as described, the skin of the antenna members acts as an effective shield for the core thereof. A core of magnetic material, such as would exist if the cylindrical antenna members were solid, or of solid laminated form, would therefore be ineffectual in the gathering of the lines of force. Further, the presence of such a core of magnetic material would be detrimental because of being so shielded from the earth's magnetic field by the skin of the antenna member. Thus, in any one position of the antenna array, the molecules of the magnetic material of the antenna members take a certain position depending upon the direction of the lines of force of the surrounding field. When the array is turned, the molecules of the skin of the antenna members immediately turn or adapt themselves to the new direction of the applied lines of force. If the antenna members are solid, however, the skin shields the core or center of each antenna member so that the molecules of the core or center turn or adapt themselves to the new direction of the applied lines of force only after a substantial time lag, coupled with vibration, this time lag being due to the time necessary for the effect of the applied lines of force to penetrate the skin to the center of the core. Because of this time lag before the entire antenna member readapts its molecular structure to the new conditions, if solid, the response of the magnetometer is delayed to an undesirable degree.

As previously pointed out, it is also important that the tubular form of the magnetic material constituting each antenna member be interrupted by at least one longitudinal gap, such as the gaps 21, so that the antenna members are not of closed circular form in cross section. Circular objects of high magnetic permeability are readily magnetized, and hence are difficult to demagnetize or to have their molecular arrangement altered. If the antenna members were made of closed circular form in cross section the members would tend to retain a transverse magnetization. Since the operation of the magnetometer depends upon the readjustment of the molecular structure of the antenna members in response to the changing direction of the lines of force under measurement, such tendency of the antenna members to retain a transverse magnetization would be undesirable. By providing the air gap or gaps 21, the antenna members are not ring-shaped in cross section and such tendency to retain a transverse magnetization is avoided. This tendency toward retaining a transverse magnetization also exists, of course, in a solid circular antenna member, the elimination of this tendency being a further advantage of the tubular antenna members shown.

As to the relative arrangement of the two antenna members, for a magnetometer to operate as described, it is essential that these antenna members be generally coaxial to one another, However, for other purposes the antenna members can be arranged at an angle to one another.

With particular reference to the permanent magnet 33 it is essential that this magnet be quite small in size. It is important that the movement of the magnetometer be free from undesirable inertia effects and to this end both this permanent magnet and the iron vane 30 on which it is mounted are necessarily of small size. Also the mounting of this magnet near the axis of rotation of the relatively small iron vane necessarily restricts its physical size. To provide a permanent magnet of the small physical size with adequate strength, the permanent magnet is made of a high coercive force alloy to provide a field of adequate magnetic strength. Definite limitations are imposed, however, on the magnetic strength of this permanent magnet. In particular, it is important that this permanent magnet be not of sufficient strength to excite the antenna members 10. For accurate readings the polarity and strength of polarization of these antenna members must be responsive substantially wholly to the surrounding magnetic field under measurement. If the polarity or strength of polarization of the antenna members is in any substantial degree influenced by the permanent magnet 33, the readings may become unreliable. In particular, the maximum readings may not fall on the angle of inclination of the earth's magnetic field; the minimum reading may not fall halfway between the maximum readings and hence on the zero point of the scale; and the maximum or minimum readings may not be 180° apart.

It is also important, as previously indicated, that the area of the polar end face of each antenna member be properly proportioned with reference to the faces of the polarized vane which oppose the antenna members. This area comprises the axial face of the end 19 of each of the laminations 18 and this area of each of the antenna members should be as great or somewhat larger than the opposing face or side of the iron vane 30. If this area at the end of each antenna member is much smaller than the opposing face of the iron vane 30 the area of the vane is not effectively used. If this area is too large in relation to the opposing face area of the iron vane, too great a leakage loss occurs.

The composition of the iron vane 30 is not particularly critical inasmuch as its polarity is maintained substantially constant by the permanent magnet 33.

In Figs. 5-7 is illustrated a similar magnetometer which is characterized by the fact that the axis of rotation of the movement is parallel with the axis of the antenna members.

As with the form of the invention shown in Figs. 1-4, each antenna member, indicated generally at 40, includes a round tubular core 41 of brass or other non-magnetic material so that each antenna member is generally round in cross section and open at its center or core. On this tubular core is wrapped a plurality of laminations of high initial magnetic permeability and low coercive force. These laminations are arranged in pairs, one pair 42 extending along one side of the core 41, around that end of the core which opposes the other antenna member, and along the opposite side of the core, the ends of the laminations terminating adjacent the outer extremities of the core. The legs or parallel portions of this pair of laminations are preferably transversely curved to fit the core 41. Another pair 45 of these laminations has a body portion transversely curved to fit one of the other sides of the tubular core 41 and has an end 46 of reduced width overlapping the pair of laminations 42 at the inner extremity of each antenna member and terminating in an extremity 47 which extends alongside and parallel with the axis of the antenna member and toward the other antenna member. A third pair 48 of these laminations is curved to fit the fourth side of the tubular core 41 and has an end 49 of reduced width overlaying the outer faces of the terminal portions 47 of the pair 45 of laminations, the extremities 47, 49 thereby providing the inner poles of the antenna members. The overlapping portions of the pairs 42 and 45 of laminations can be secured together in any suitable manner, as by the brass eyelet or grommet 50 shown, and the laminations can be secured to the tubular core in any suitable manner. The several pairs of these laminations are also circumferentially spaced from one another to provide axially extending gaps 51 therebetween.

The two antenna members 40 are secured to a casing or support (not shown) in axially opposed relation to each other with their poles or extensions 47, 49 arranged on opposite sides of the axis thereof so as to provide a gap 52. This gap is transversely across the antenna array, the poles of the array thereby being perpendicular to the axis of the array instead of in alinement therewith, as with the form of the invention shown in Figs. 1-4. In this gap is arranged a movement which is identical to the movement of Figs. 1-4 and shown in perspective in Fig. 4 and the description is therefore not repeated, the same reference numerals being employed. However, this movement is mounted to rotate about an axis parallel with the axis of the antenna array instead of at right angles thereto as with the form of the invention shown in Figs. 1-4. In both cases, however, the polarized iron vane 30 is arranged between the poles of the antenna members so that both forms of the invention operate in the same manner, as previously described, and the same proportions should be observed in its construction, the only distinction being the direction of rotation of the movement and pointer, this being on an axis at right angles to the axis of the antenna array in the form of the invention shown in Figs. 1-4 and on an axis parallel therewith in the form of the invention shown in Figs. 5-7.

From the foregoing it will be seen that the present invention provides a sensitive, accurate and rugged magnetometer which operates independently of an external power source. Further, the magnetometer is extremely inexpensive in construction and free from service difficulties thereby greatly increasing its range of usefulness.

I claim as my invention:

1. In a magnetometer having a pair of longitudinally spaced antenna members having high permeability and concentrating an external magnetic field in the space therebetween to provide oppositely polarized opposed ends, and a member for indicating changes in said field, the combination therewith of means actuating said indicating member in response to said changes, comprising a vane of magnetizable material pivoted at one side and having its free side interposed between said opposed ends of said antenna members, and a permanent magnet fixed to the pivoted side of said vane and arranged outside of said gap and polarizing said vane whereby said vane is swung toward one or the other of said opposed ends of said antenna members in response to changes in polarity thereof.

2. In a magnetometer having a pair of longitudinally spaced antenna members having high permeability and concentrating an external magnetic field in the space therebetween to provide oppositely polarized opposed ends and a member for indicating changes in said field, the combination therewith of means actuating said indicating member in response to said changes, comprising a vane of magnetizable material pivoted at one side and having its free side interposed between said opposed ends of said antenna members, and a relatively small permanent magnet of high coercive force alloy fixed to the pivoted side of said vane and arranged outside of said gap and polarizing said vane whereby said vane is swung toward one or the other of said antenna members in response to changes in polarity thereof.

3. In a magnetometer, a pair of longitudinally spaced antenna members having high permeability and having relatively broad opposed polar faces and concentrating an external magnetic field in the space between said polar faces, a vane of magnetizable material pivoted adjacent one edge on an axis arranged out of line with the axes of said antenna members, said vane being interposed between said polar faces of said antenna members with its broad faces in opposed relation thereto, means arranged outside of said gap and polarizing said vane whereby it is swung toward one or the other of said polar faces in response to changes in polarity thereof, the area of each of said broad polar faces being larger than the opposing broad face of said vane, and an indicator operatively connected with said polarized member and actuated in response to the movement thereof.

4. In a magnetometer, an antenna member having high magnetic permeability and adapted to concentrate an external magnetic field at a relatively broad polar face thereof, a permanently polarized member having opposite relatively broad faces opposing the broad polar face of said antenna member, means rotatably supporting said permanently polarized member to one side of the center of said concentrated field for movement of its broad face relatively to said polar face of said antenna member in response to changes in said concentrated field, and an indicator operatively connected with said polarized member and actuated in response to the movement thereof.

JACOB H. RUBENSTEIN.

REFERENCES CITED

The following references are of record in the file of this patent:

UNITED STATES PATENTS

| Number | Name | Date |
| --- | --- | --- |
| 508,827 | Knap et al. | Nov. 14, 1893 |
| 1,863,415 | Rieber | June 14, 1932 |
| 1,863,421 | Tear | June 14, 1932 |
| 1,976,531 | Watts | Oct. 9, 1934 |
| 2,053,154 | La Pierre | Sept. 1, 1936 |
| 2,123,045 | Hoare | July 5, 1938 |
| 2,275,868 | Scheldorf | Mar. 10, 1942 |
| 2,388,848 | Howe | Nov. 13, 1945 |

FOREIGN PATENTS

| Number | Country | Date |
| --- | --- | --- |
| 276,652 | Great Britain | May 24, 1928 |